(12) United States Patent
Mitsunaga

(10) Patent No.: US 9,357,137 B2
(45) Date of Patent: May 31, 2016

(54) IMAGING APPARATUS, SIGNAL PROCESSING METHOD, AND PROGRAM

(75) Inventor: Tomoo Mitsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/238,216

(22) PCT Filed: Jun. 29, 2012

(86) PCT No.: PCT/JP2012/066671
§ 371 (c)(1),
(2), (4) Date: Feb. 11, 2014

(87) PCT Pub. No.: WO2013/031368
PCT Pub. Date: Mar. 7, 2013

(65) Prior Publication Data
US 2014/0192250 A1    Jul. 10, 2014

(30) Foreign Application Priority Data

Aug. 31, 2011  (JP) ................................. 2011-190054
Dec. 14, 2011  (JP) ................................. 2011-273426

(51) Int. Cl.
*H04N 5/238*       (2006.01)
*H04N 5/335*       (2011.01)
(Continued)

(52) U.S. Cl.
CPC ........... *H04N 5/2353* (2013.01); *H04N 5/2355* (2013.01); *H04N 5/3535* (2013.01); *H04N 5/35554* (2013.01); *H04N 5/37457* (2013.01); *H04N 9/045* (2013.01)

(58) Field of Classification Search
CPC ..... H04N 9/045; H04N 5/232; H04N 5/3355; H04N 5/347; H04N 2209/043; H04N 5/35581; H04N 5/35536; H04N 5/2353
USPC ......... 348/277, 280, 270, 268, 273, 349, 364, 348/234, 229.1, 230.1; 250/208.1
See application file for complete search history.

(56) References Cited

U.S. PATENT DOCUMENTS 6,999,119 B1    2/2006  Shibazaki et al.
2005/0230774 A1 * 10/2005  Suzuki ................... H04N 5/353
                                                       257/443

(Continued)

FOREIGN PATENT DOCUMENTS

JP    11-029880 A    2/1999
JP    2000-050151 A  2/2000

(Continued)

*Primary Examiner* — Sinh Tran
*Assistant Examiner* — Xi Wang
(74) *Attorney, Agent, or Firm* — Wolf, Greenfield & Sacks, P.C.

(57) ABSTRACT

Apparatus and method for generating a wide dynamic range image by executing a pixel value combination process of a plurality of different exposure time setting pixels. Control of a different exposure time is performed for each of a plurality of pixels of the same colors configuring a pixel block and an addition pixel value obtained by adding outputs of the plurality of pixels of the same colors of the pixel block is generated. The generation of the addition pixel value is executed by an adding unit that adds the outputs of the plurality of pixels of the same colors of the pixel block. Or, the generation of the addition pixel value is executed by a floating diffusion set in a pixel block unit and a charge output from each of the plurality of pixels of the same colors configuring the pixel block is accumulated and output in the floating diffusion.

9 Claims, 12 Drawing Sheets

(51) Int. Cl.
*H04N 5/235* (2006.01)
*H04N 5/353* (2011.01)
*H04N 5/355* (2011.01)
*H04N 5/3745* (2011.01)
*H04N 9/04* (2006.01)

(56) References Cited

U.S. PATENT DOCUMENTS

| | | | |
|---|---|---|---|
| 2006/0245014 A1 | 11/2006 | Haneda | |
| 2007/0177048 A1* | 8/2007 | Van Dyke | G03B 7/00 348/362 |
| 2009/0073306 A1* | 3/2009 | Kwon | H04N 5/2351 348/362 |
| 2009/0200451 A1* | 8/2009 | Conners | 250/208.1 |
| 2009/0290052 A1* | 11/2009 | Liu et al. | 348/277 |
| 2010/0141812 A1 | 6/2010 | Hirota | |
| 2010/0277631 A1* | 11/2010 | Sugiyama | H04N 5/374 348/297 |
| 2010/0315534 A1* | 12/2010 | Azuma | H04N 9/045 348/234 |
| 2011/0279693 A1* | 11/2011 | Hamada | H04N 5/335 348/208.4 |
| 2013/0010153 A1* | 1/2013 | Kasai | H04N 5/347 348/222.1 |
| 2013/0051700 A1* | 2/2013 | Jo | H04N 5/23254 382/284 |
| 2013/0222546 A1* | 8/2013 | Takahashi | H01L 27/14623 348/46 |

FOREIGN PATENT DOCUMENTS

| | | |
|---|---|---|
| JP | 2000-069491 A | 3/2000 |
| JP | 2005-072966 A | 3/2005 |
| JP | 2006-311240 A | 11/2006 |
| JP | 2007-124137 A | 5/2007 |
| JP | 2008-099073 A | 4/2008 |
| JP | 2010-136225 A | 6/2010 |
| JP | 2011-066505 A | 3/2011 |

* cited by examiner

FIG. 2

(3) FOUR-DIVISIONAL WRB TYPE ARRAY (2) FOUR-DIVISIONAL Bayer TYPE RGB ARRAY (1) Bayer ARRAY

IMAGING APPARATUS, SIGNAL PROCESSING METHOD, AND PROGRAM

CROSS REFERENCES TO RELATED APPLICATIONS

The present application is a national stage application under 35 U.S.C. §371 of PCT Application No. PCT/JP2012/066671, filed Jun. 29, 2012, which claims priority to Japanese Patent Application No. 2011-273426, filed Dec. 14, 2011, and to Japanese Patent Application No. 2011-190054, filed Aug. 31, 2011, the entire contents of each of which is incorporated herein by reference.

TECHNICAL FIELD

The present disclosure relates to an imaging apparatus, a signal processing method, and a program. In detail, the present disclosure relates to an imaging apparatus, a signal processing method, and a program that enable an image of a wide dynamic range to be generated.

BACKGROUND ART

Solid-state imaging devices such as a CCD image sensor or a complementary metal oxide semiconductor (CMOS) image sensor that are used in a video camera or a digital still camera perform photoelectric conversion for accumulating a charge according to an amount of incident light and outputting an electric signal corresponding to the accumulated charge. However, there is an upper limit in a charge accumulation amount in a photoelectric conversion element. If light of an amount equal to or more than a constant amount is received, so-called overexposure in which an accumulation charge amount reaches a saturation level and a brightness level of a subject region of constant brightness or more is set to a saturated brightness level may be generated.

To prevent such a phenomenon, a process for controlling a charge accumulation period in the photoelectric conversion element according to a change of external light, adjusting an exposure time, and controlling sensitivity to an optimal value is executed. For example, for a bright subject, a shutter is released fast to decrease an exposure time and decrease the charge accumulation period in the photoelectric conversion element and the electric signal is output before the accumulation charge amount reaches the saturation level. By this process, an output of an image in which a gradation according to a subject is exactly reproduced is enabled.

However, if the shutter is released fast in imaging of a subject in which a bright place and a dark place are mixed, a sufficient exposure time is not taken in a dark portion. For this reason, S/N is deteriorated and an image quality is lowered. As such, in an image obtained by imaging the subject in which the bright place and the dark place are mixed, exactly reproducing bright levels of a bright portion and a dark portion requires a process for increasing an exposure time and realizing high S/N in pixels in which incident light on an image sensor is small and avoiding saturation in pixels in which incident light is large.

As a method for realizing such a process, a method of continuously imaging a plurality of images having different exposure times and combining the plurality of images is known. That is, this method is a method of continuously and individually imaging a long time exposure image and a short time exposure image, executing a combination process using the long time exposure image for a dark image region and using the short time exposure image for a bright image region in which overexposure may be generated in the long time exposure image, and generating one image. As such, the plurality of different exposure images are combined, so that an image of a wide dynamic range not having the overexposure, that is, a wide dynamic range image (HDR image) can be obtained.

For example, Patent Document 1 (JP 2000-50151 A) discloses a configuration in which two images to which a plurality of different exposure times are set are imaged, these images are combined, and an image of a wide dynamic range is obtained. This process will be described with reference to FIG. 1. An imaging device outputs image data of two different exposure times in a video rate (30 to 60 fps), for example, when a moving image is imaged. In addition, when a still image is imaged, the imaging device generates image data of two different exposure times and outputs the image data. FIG. 1 is a diagram illustrating characteristics of images (a long time exposure image and a short time exposure image) that are generated by the imaging device and have two different exposure times. A horizontal axis shows a time (t) and a vertical axis shows an accumulation charge amount (e) in a light reception photodiode (PD) configuring a photoelectric conversion element corresponding to one pixel of a solid-state imaging element.

For example, in the case in which a light reception amount of the light reception photodiode (PD) is large, that is, the case of corresponding to a bright subject, as shown in a high brightness region 11 illustrated in FIG. 1, a charge accumulation amount increases rapidly over time. Meanwhile, in the case in which the light reception amount of the light reception photodiode (PD) is small, that is, the case of corresponding to a dark subject, as shown in a low brightness region 12 illustrated in FIG. 1, the charge accumulation amount increases moderately over time.

Times t0 to t3 correspond to an exposure time TL to acquire the long time exposure image. Even when the time is the exposure time TL of the long time, in a line shown in the low brightness region 12, a charge accumulation amount does not reach a saturation level at the time t3 (non-saturation point Py) and an exact gradation expression can be obtained by a gradation level of a pixel determined by using an electric signal obtained on the basis of a charge accumulation amount (Sa).

However, in a line shown in the high brightness region 11, it is clear for the charge accumulation amount to already reach the saturation level (saturation point Px), before reaching the time t3. Therefore, in the high brightness region 11, only a pixel value corresponding to the electric signal of the saturation level is obtained from the long time exposure image. As a result, pixels may become overexposure pixels.

Accordingly, in the high brightness region 11, an accumulation charge of the light reception photodiode (PD) is swept once at a time before reaching the time t3, for example, the time t1 (charge sweeping start point P1) illustrated in the drawing. The charge sweeping is performed to an intermediate voltage holding level controlled in the photodiode (PD), not for the entire charge accumulated in the light reception photodiode (PD). After a charge sweeping process, the short time exposure is performed again at the exposure time TS (t2 to t3). That is, the short time exposure of a period from the short time exposure start point P2 to a short time exposure end point P3 in the drawing is performed. A charge accumulation amount (Sb) is obtained by the short time exposure and a gradation level of a pixel is determined on the basis of an electric signal obtained on the basis of the charge accumulation amount (Sb).

When a pixel value is determined on the basis of the electric signal based on the charge accumulation amount (Sa) obtained by the long time exposure in the low brightness region 12 and the electric signal based on the charge accumulation amount (Sb) obtained by the short time exposure in the high brightness region 251, an estimated charge accumulation amount when the same time exposure is performed and an electric signal output value corresponding to the estimated charge accumulation amount are calculated and a pixel value level is determined on the basis of a calculated result.

As such, the short time exposure image and the long time exposure image are combined, so that an image of a wide dynamic range not having overexposure can be obtained.

However, in all of the configurations described in Patent Document 1, it is necessary to execute the process for individually imaging the long time exposure image and the short time exposure image and combining the long time exposure image and the short time exposure image.

As such, a wide dynamic range image (HDR image) can be generated by using the plurality of images in which the exposure times are changed. However, the following problems occur in the process based on the plurality of images.

Problem 1: imaging needs to be performed several times and a memory to store images needs to be provided.

Problem 2: because a plurality of images of which imaging timings are different are combined or imaging data of long time exposure is used, camera shaking is easily generated.

Also, a process for setting a long time exposure pixel and a short time exposure pixel in one imaging image without using a plurality of images, combining the pixels of different exposure times, and generating a wide dynamic range image has been suggested.

For example, this process is described in Patent Document 2 (JP 11-29880 A) and Patent Document 3 (JP 2000-69491 A).

In this process, setting for arranging a plurality of pixels of the same colors such as R pixels of 2×2 pixels, G pixels of 2×2 pixels, and B pixels of 2×2 pixels in an imaging element (image sensor) is performed, the different exposure times are set to the constituent pixels of the 2×2 pixels of the same colors, and imaging is executed. Pixel values of the same colors of the different exposure times imaged by the image sensor are combined and a wide dynamic range image is obtained.

However, in the configurations described above, noise is likely to be generated due to manufacturing variations of elements or filters and it is difficult to acquire an image of a high quality.

CITATION LIST

Patent Documents

Patent Document 1: JP 2000-50151 A
Patent Document 2: JP 11-29880 A
Patent Document 3: JP 2000-69491 A

SUMMARY OF THE INVENTION

Problems to be Solved by the Invention

The present disclosure has been made in view of the above circumstances and it is an object of the present disclosure to provide an imaging apparatus, a signal processing method, and a program that enable a wide dynamic range image of a high quality to be generated on the basis of a one-time imaging image.

Further, it is an object of the present disclosure to provide an imaging apparatus, a signal processing method, and a program that enable a wide dynamic range image to be generated on the basis of an imaging image having an array different from a Bayer array.

Solutions to Problems

A first aspect of the present disclosure is an imaging apparatus including a pixel unit in which pixel blocks each including a plurality of pixels of the same colors are arranged, a control unit that performs control of a different exposure time for each of the plurality of pixels of the same colors configuring the pixel block, and an addition pixel value generating unit that generates an addition pixel value obtained by adding outputs of the plurality of pixels of the same colors of the pixel block.

In one embodiment of the imaging apparatus according to the present disclosure, the addition pixel value generating unit is configured by an addition circuit having an adding unit that adds the outputs of the plurality of pixels of the same colors of the pixel block.

In one embodiment of the imaging apparatus according to the present disclosure, the pixel block is configured by pixels of the same colors including a plurality of pixels of a plurality of rows×a plurality of columns and the addition circuit has a register that stores pixel values of a plurality of pixels set to a precedent read row of the pixel block and an adding unit that adds read pixel values of a plurality of pixels set to a following read row of the pixel block and the pixel values stored in the register.

In one embodiment of the imaging apparatus according to the present disclosure, the pixel block is configured by pixels of the same colors including four pixels of 2 rows×2 columns and the addition circuit has a register that stores pixel values of two pixels set to a precedent read row of the pixel block and an adding unit that adds read pixel values of two pixels set to a following read row of the pixel block and the pixel values stored in the register.

In one embodiment of the imaging apparatus according to the present disclosure, the addition pixel value generating unit is configured by a floating diffusion (FD) set in the pixel block unit and the floating diffusion (FD) has a configuration in which a charge output from each of the plurality of pixels of the same colors configuring the pixel block is accumulated.

In one embodiment of the imaging apparatus according to the present disclosure, the pixel unit has a four-divisional Bayer type RGB array and has an array configuration of a pixel block including four pixels in a unit of each color of R, G, and B.

In one embodiment of the imaging apparatus according to the present disclosure, the pixel unit has a four-divisional WRB array in which G pixels in a four-divisional Bayer type RGB array are replaced by W pixels of a total visible light wavelength transmission type and has an array configuration of a pixel block including four pixels in a unit of each color of W, R, and B.

Further, a second aspect of the present disclosure is a signal processing method that is executed in an imaging apparatus. The imaging apparatus has a pixel unit in which pixel blocks each including a plurality of pixels of the same colors are arranged, a control unit executes an exposure control process for performing control of a different exposure time for each of the plurality of pixels of the same colors configuring the pixel block, and an addition pixel value generating unit executes an addition pixel value generation process for generating an addition pixel value obtained by adding outputs of the plurality of pixels of the same colors of the pixel block.

Further, a third aspect of the present disclosure is a program for causing a signal process to be executed in an imaging apparatus. The imaging apparatus has a pixel unit in which pixel blocks each including a plurality of pixels of the same colors are arranged, the program causes a control unit to execute an exposure control process for performing control of a different exposure time for each of the plurality of pixels of the same colors configuring the pixel block, and the program causes an addition pixel value generating unit to execute an addition pixel value generation process for generating an addition pixel value obtained by adding outputs of the plurality of pixels of the same colors of the pixel block.

The program according to the present disclosure is a program that can be provided to an information processing apparatus or a computer/system that can execute various programs/codes, by a storage medium and a communication medium provided in a computer readable format. This program is provided in the computer readable format, so that a process according to the program is realized on the information processing apparatus or the computer/system.

Other objects, features, and advantages of the present disclosure will become apparent from the following detailed description based on embodiments of the present disclosure to be described later and the accompanying drawings. In the present specification, a system means a logical aggregate structure of a plurality of apparatuses and is not limited to a structure in which an apparatus of each configuration is in the same casing.

Effects of the Invention

According to the configuration of one embodiment of the present disclosure, an apparatus and a method for generating a wide dynamic range image by executing a pixel value combination process of a long time exposure pixel and a short time exposure pixel are realized.

Specifically, control of a different exposure time is performed for each of a plurality of pixels of the same colors configuring a pixel block and an addition pixel value obtained by adding outputs of the plurality of pixels of the same colors of the pixel block is generated. The generation of the addition pixel value is executed in an operation unit having an adding unit that that adds the outputs of the plurality of pixels of the same colors of the pixel block. Or, the generation of the addition pixel value is executed by a floating diffusion (FD) set in a pixel block unit and a charge output from each of the plurality of pixels of the same colors configuring the pixel block is accumulated and output in the floating diffusion (FD).

By this configuration, a wide dynamic range image can be generated.

BRIEF DESCRIPTION OF DRAWINGS

FIG. 2 is a diagram illustrating a configuration example of an imaging element.

MODES FOR CARRYING OUT THE INVENTION

Figure 1:
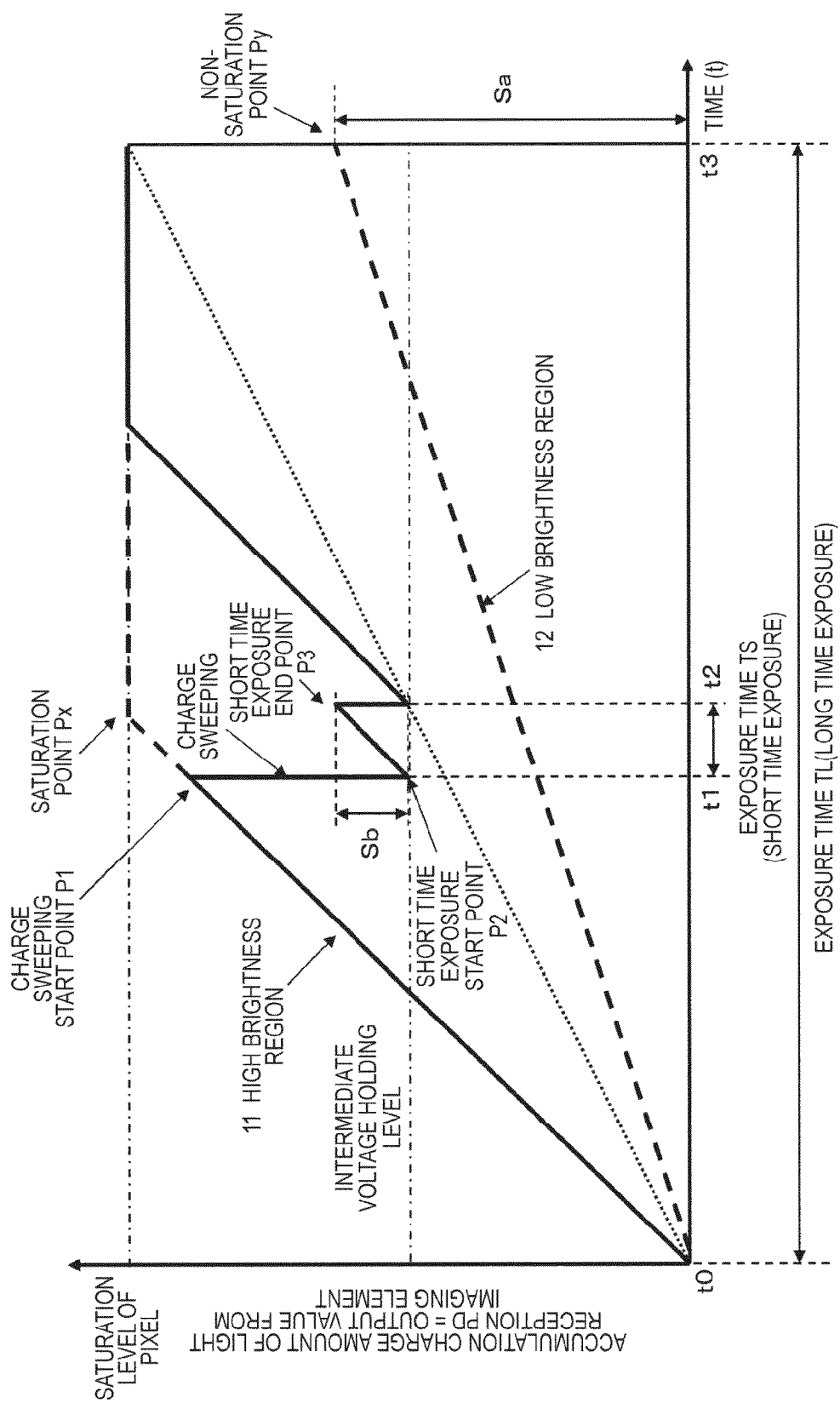
FIG. 1 is a diagram illustrating an imaging process example of a wide dynamic range image by a plurality of image imaging.

Hereinafter, an imaging apparatus, a signal processing method, and a program according to the present disclosure will be described in detail with reference to the drawings. The description is made according to the following items.
1. With respect to configuration example of pixel unit of imaging device
2. With respect to a configuration example of imaging apparatus
3. With respect to configuration example of imaging device
4. With respect to exposure time control configuration of pixel unit and calculation process example of output pixel value
5. With respect to specific circuit configuration example of imaging device
6. Floating diffusion (FD) addition configuration example
7. With respect to other embodiments
8. Summary of configuration according to present disclosure

[1. With Respect to Configuration Example of Pixel Unit of Imaging Device]

A configuration example of a pixel unit of an imaging device to be a component of an imaging apparatus according to the present disclosure will be described with reference to FIG. 2. FIG. 2 illustrates the following three configuration examples of the pixel unit of the imaging device.
(1) Bayer Array
(2) Four-Divisional Bayer Type RGB Array
(3) Four-Divisional WRB Type Array (1) The Bayer array is an array adopted in many cameras and a signal process for an imaging image having a color filter with such a Bayer array is almost established.

However, it cannot be yet said that sufficient studies have been made about the signal process for an image imaged by an imaging element having the filter, for (2) the four-divisional Bayer type RGB array and (3) the four-divisional WRB type array.

Further, (2) the four-divisional Bayer type RGB array corresponds to an array in which each pixel of R, G and B of the Bayer array shown in (1) is set as four pixels.

(3) The four-divisional WRB array is an array in which each pixel of R, G and B of the Bayer array shown in (1) is set as four pixels and a W (white) pixel is set, instead of the G pixel.

In the following embodiment, an imaging apparatus that executes a signal process for an image imaged by an imaging element including a color filter with (2) the four-divisional Bayer type RGB type array illustrated in FIG. 2 will be described.

[2. With Respect to Configuration Example of Imaging Apparatus]

Figure 3:
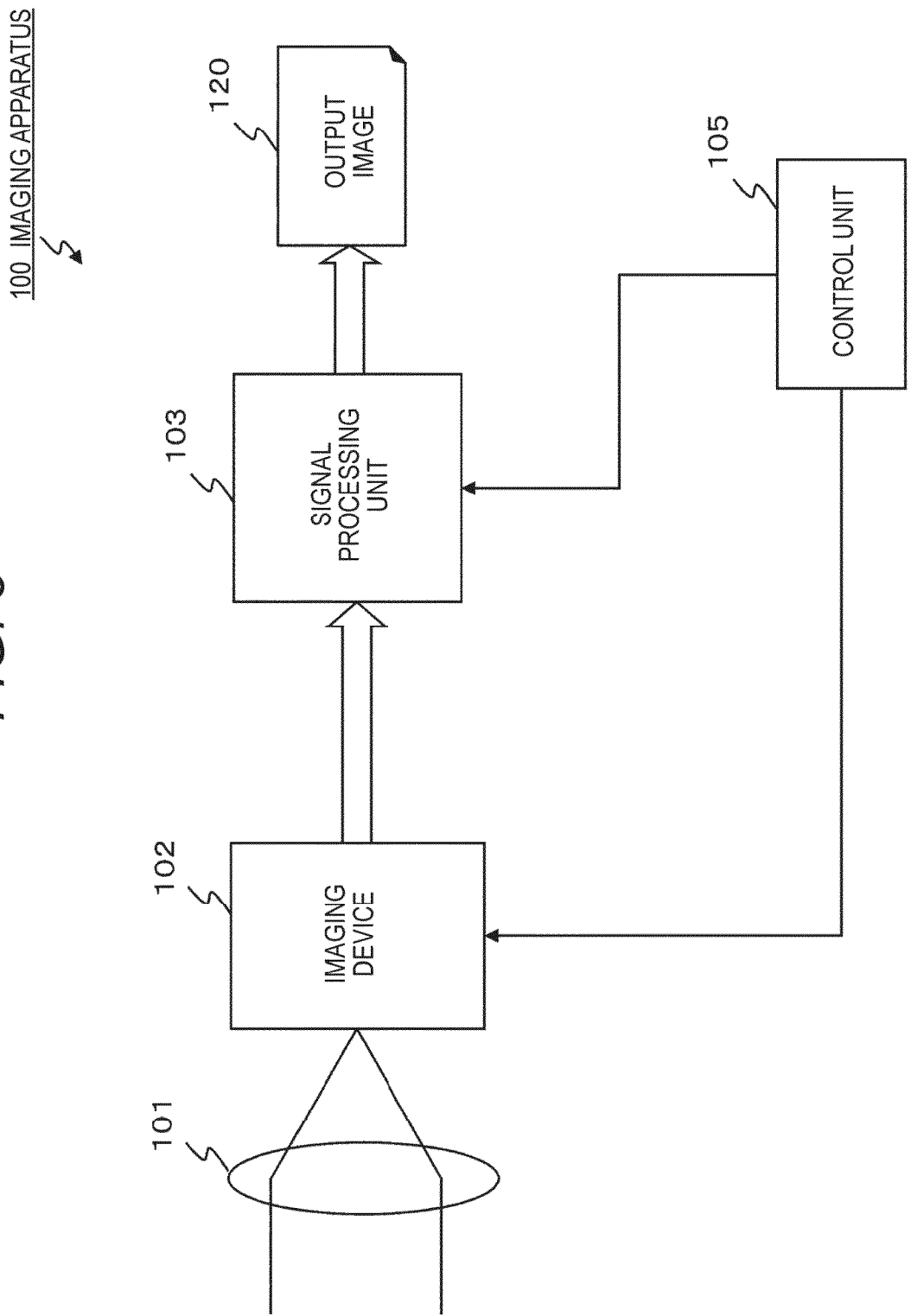
FIG. 3 is a diagram illustrating a configuration example of an imaging apparatus.

FIG. 3 is a block diagram illustrating a configuration example of an imaging apparatus 100 according to the present disclosure. Light that is incident through an optical lens 101 is incident on an imaging device 102 configured by an imaging unit, for example, a CMOS image sensor and image data by photoelectric conversion is output. The output image data is input to a signal processing unit 103. The signal processing unit 103 executes a signal process in a general camera such as white balance (WB) adjustment and gamma correction and generates an output image 120. The output image 120 is stored in a storage unit not illustrated in the drawings. Or, the output image 120 is output to a display unit.

A control unit 105 outputs a control signal to each unit according to a program stored in a memory not illustrated in the drawings and controls various processes.

[3. With Respect to Configuration Example of Imaging Device]

Next, a configuration example of the imaging device 102 will be described with reference to FIG. 4.

Figure 4:
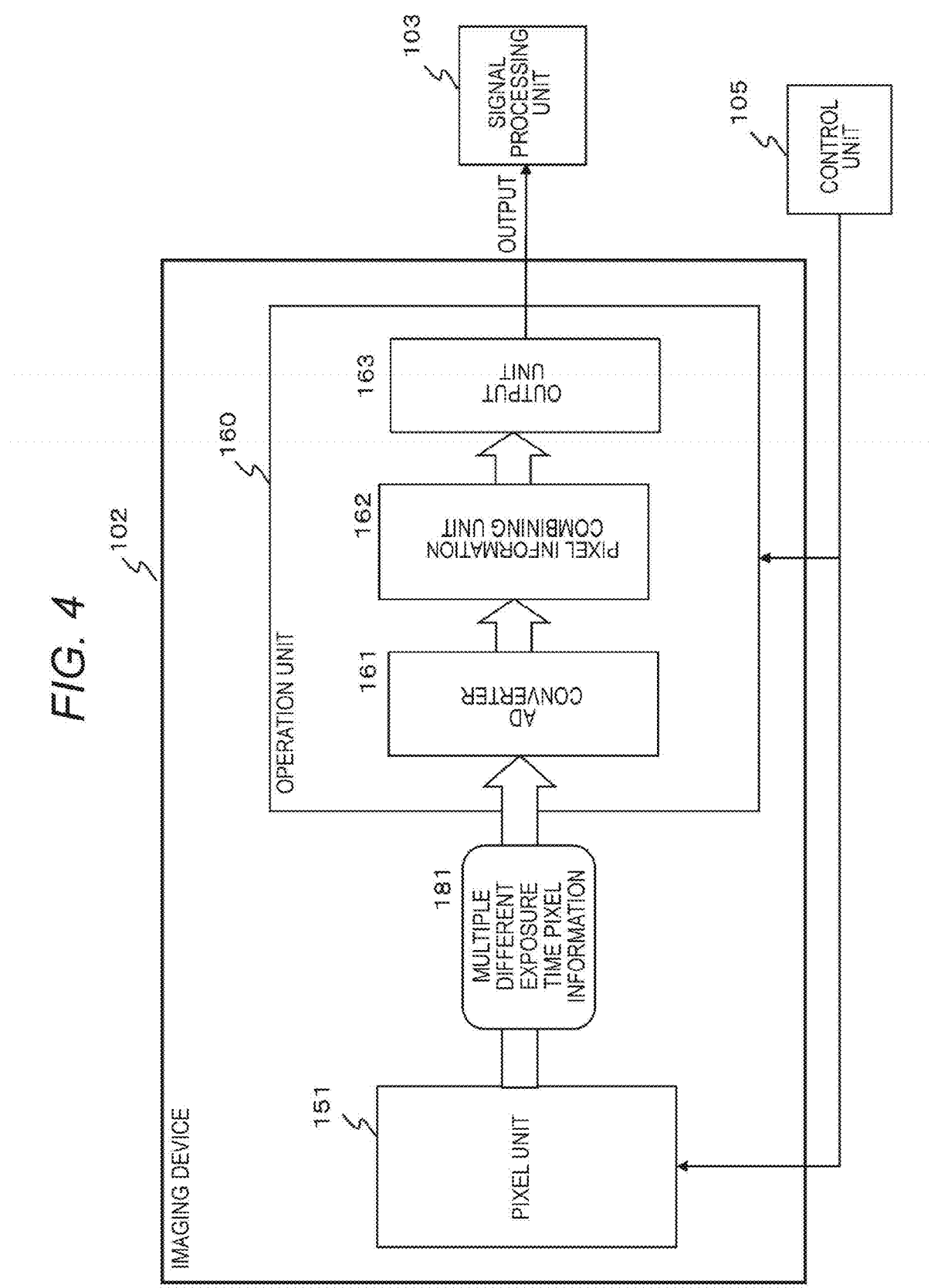
FIG. 4 is a diagram illustrating a configuration example of an imaging device.

FIG. 4 is a diagram illustrating a configuration of the imaging device 102 according to an embodiment of the present disclosure.

The imaging device 102 has a pixel unit 151 and an operation unit 160 functioning as an addition pixel value generating unit, as illustrated in FIG. 4.

The operation unit 160 has an A/D convertor 161, a pixel information combining unit 162, and an output unit 163.

The operation unit 160 may have a configuration on the same chip as the pixel unit 151, that is, a configuration set in an on-chip or a configuration set in a chip or a device different from the pixel unit 151.

The pixel unit 151 accumulates a charge based on subject light in each of a plurality of pixels and outputs image data of a high pixel number to be a high resolution image.

In addition, although described in detail below with reference to FIG. 5 and the following drawings, the pixel unit 151 is configured to output pixel information of different exposure times of four kinds in the same color pixel block unit of a 2×2 pixel unit. That is, multiple different exposure time pixel information 181 illustrated in FIG. 4 is output.

The multiple different exposure time pixel information 181 is input from the pixel unit 151 to the operation unit 160 functioning as the addition pixel value generating unit.

The A/D convertor 161 of the operation unit 160 executes a process for performing A/D conversion of an input signal, that is, converting an analog signal into a digital signal and inputs a digital value after the conversion to the pixel information combining unit 162.

In the pixel information combining unit 162, an output pixel value is calculated by an addition process of the multiple different exposure time pixel information 181. For example, the pixel information combining unit 162 calculates one pixel value of an output image, on the basis of four pixel signals. The pixel information combining unit 162 executes a pixel value combination process, generates a wide dynamic range image in which the number of pixels is decreased, and outputs the wide dynamic range image through the output unit 163.

[4. With Respect to Exposure Time Control Configuration of Pixel Unit and Calculation Process Example of Output Pixel Value]

Next, an exposure time control configuration of the pixel unit 151 and a calculation process example of an output pixel value executed in the pixel information combining unit 162 of the operation unit 160 will be described.

Figure 5:
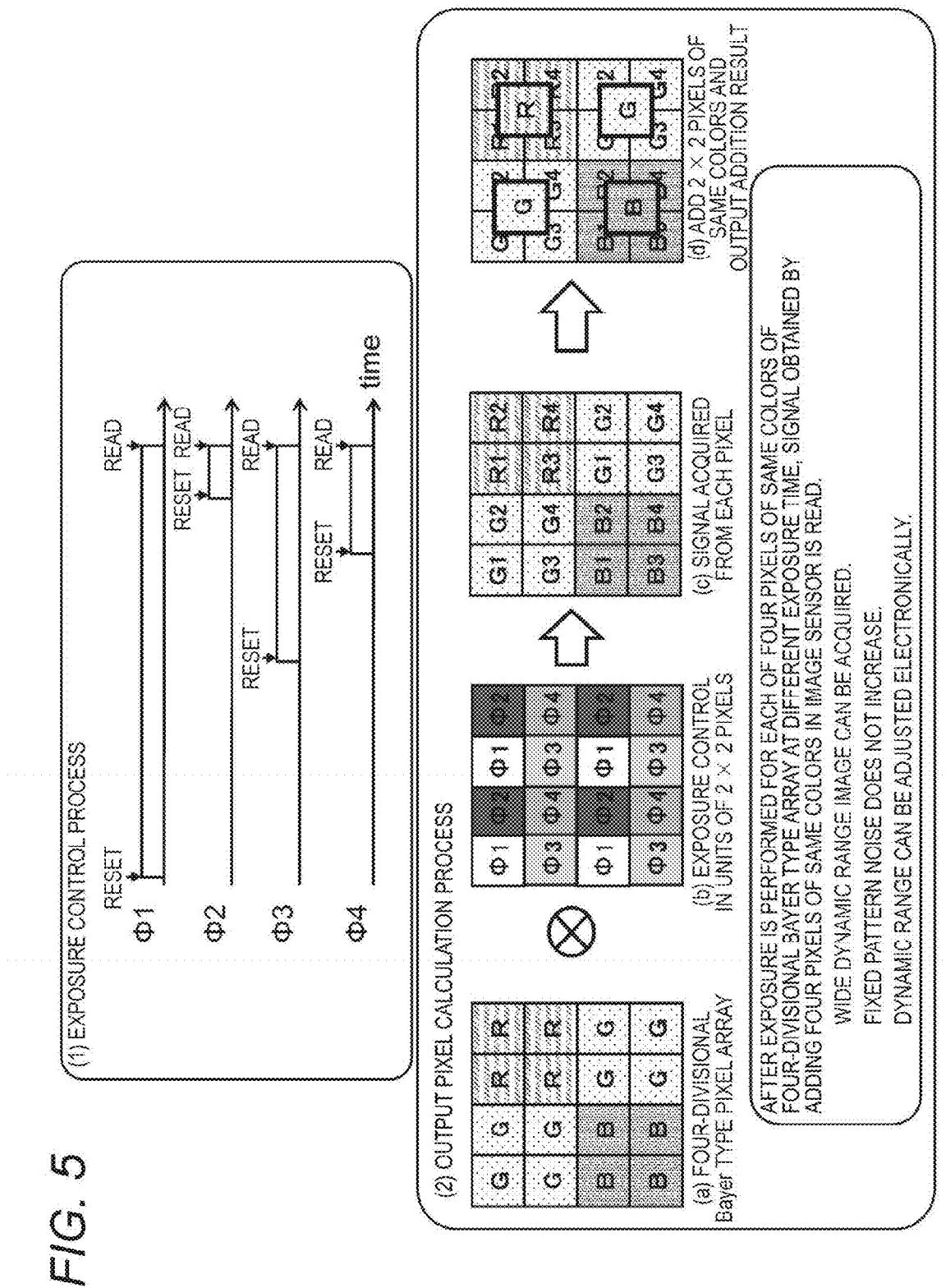
FIG. 5 is a diagram illustrating exposure control and a generation example of an output image.

FIG. 5 illustrates the following drawings.
(1) Exposure Control Process
(2) Output Pixel Value Calculation Process In this process example, the pixel unit 151 has the four-divisional Bayer type RGB array described above with reference to FIG. 2(2), as illustrated in (a) of FIG. 5(2). The four-divisional Bayer type RGB array corresponds to an array in which each pixel of R, G and B of the Bayer array shown in FIG. 2(1) is set as four pixels.

The configuration of the pixel unit has the four-divisional Bayer type RGB array illustrated in (a) of FIG. 5(2). That is, the configuration of the pixel unit becomes a configuration in which a block of four pixels of 2×2 is set to each of the pixels of the same colors (R, G, or B).

Imaging is performed for each of the four pixels of each same color block, under setting of four exposure times, as illustrated in FIG. 5(1).

FIG. 5(1) illustrates a control sequence of four different exposure times of $\Phi 1$, $\Phi 2$, $\Phi 3$, and $\Phi 4$ as an exposure time control sequence.

The lengths of the exposure times are set as $\Phi 1 > \Phi 3 > \Phi 4 > \Phi 2$.

As illustrated in (b) of FIG. 5(2), imaging is performed under setting of four different exposure times, in a four pixel block unit of each of R, G, and B.

In an image imaged under the exposure control, four different exposure pixel values are acquired in a four pixel block unit of each of R, G, and B, as illustrated in (c) of FIG. 5(2).

For example, in four G pixels of an upper left portion of (c) of FIG. 5(2), four exposure time correspondence pixel values of G1=longest exposure time correspondence pixel value according to exposure control parameter $\Phi 1$, G3=second long exposure time correspondence pixel value according to exposure control parameter $\Phi 3$, G4=third long exposure time correspondence pixel value according to exposure control parameter $\Phi 4$, and G2=fourth long exposure time correspondence pixel value according to exposure control parameter $\Phi 2$ are obtained.

This is the same in all of the R, G, and B pixel blocks and four exposure time correspondence pixel values are obtained.

As such, after exposure is performed for each of the four pixels of the same colors of the four-divisional Bayer type array at the different exposure time, the pixel information combining unit 162 of the operation unit 160 generates an addition signal of the pixel values of the four pixels of the same colors and outputs the addition signal.

As illustrated in (d) of FIG. 5(2), one output pixel value corresponding to a block including four pixels is set and output. By this process, a wide dynamic range image is generated and output.

By this configuration, a configuration in which fixed pattern noise is suppressed from increasing and a dynamic range can be adjusted electronically is realized.

[5. With Respect to Specific Circuit Configuration Example of Imaging Device]

Next, a specific circuit configuration example of an imaging device will be described.

Figure 6:
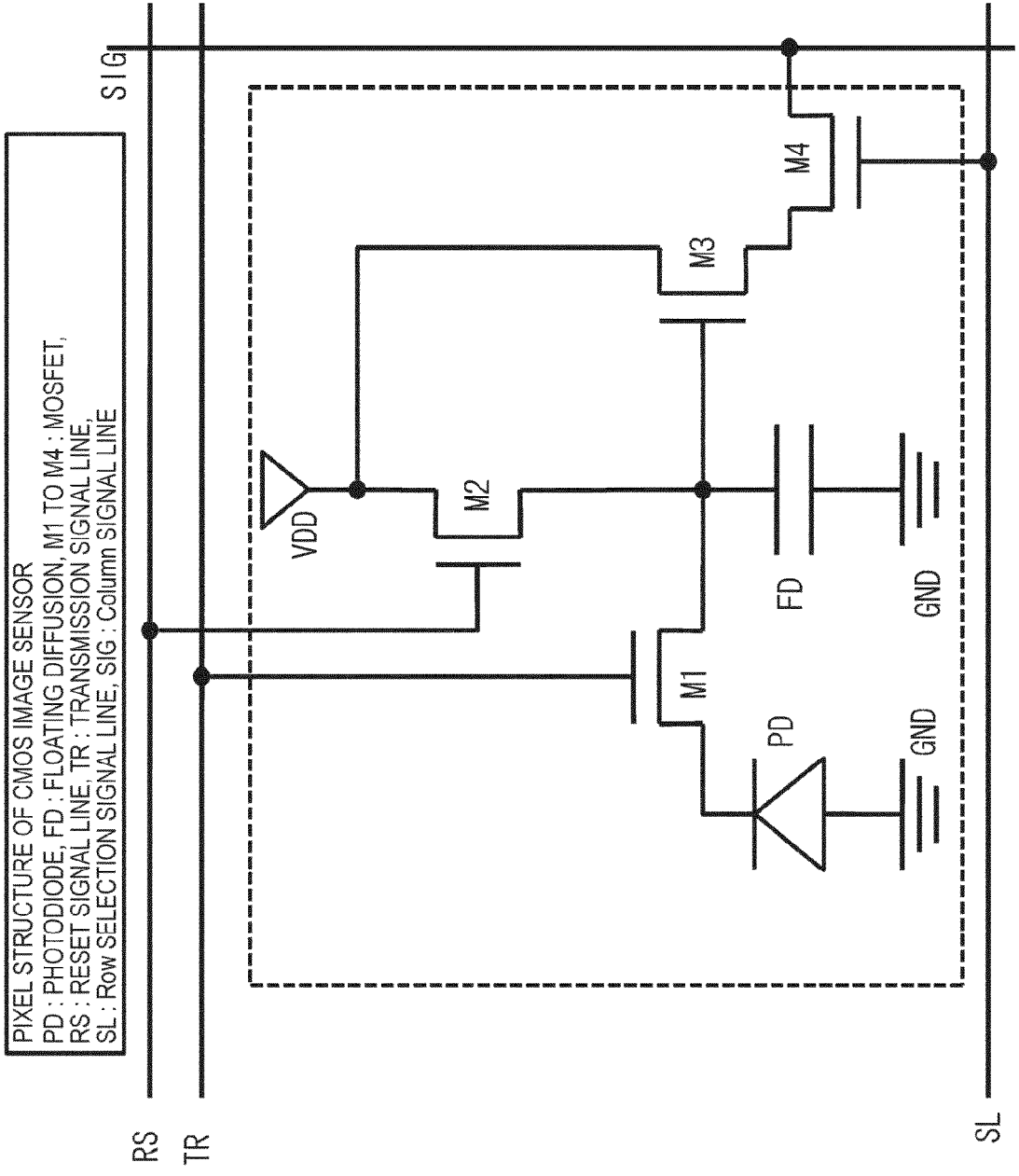
FIG. 6 is a diagram illustrating a configuration example of an imaging device.

FIG. 6 illustrates one pixel structure of a CMOS image sensor.

PD: photodiode
FD: floating diffusion
M1 to M4: transistor (MOSFET)
RS: reset signal line
TR: transmission signal line
SL: row selection signal line
SIG: column signal line.

If light is incident on the pixel, a charge according to an amount of light is generated by photoelectric conversion in the photodiode (PD). The charge accumulated in the photodiode (PD) is transmitted to the floating diffusion (FD) through a transistor (M1). The transistor (M1) is controlled by a control signal of the transmission signal line (TR). A transistor (M2) is supplied with power and executes a reset operation of the charge accumulated in the floating diffusion (FD). The transistor (M2) is controlled by a control signal of the reset signal line (RS). The charge accumulated in the floating diffusion (FD) is amplified by a transistor (M3) and is output from the column signal line (SIG) through a transistor (M4). The transistor (M4) is controlled by a control signal of the row selection signal line.

Figure 7:
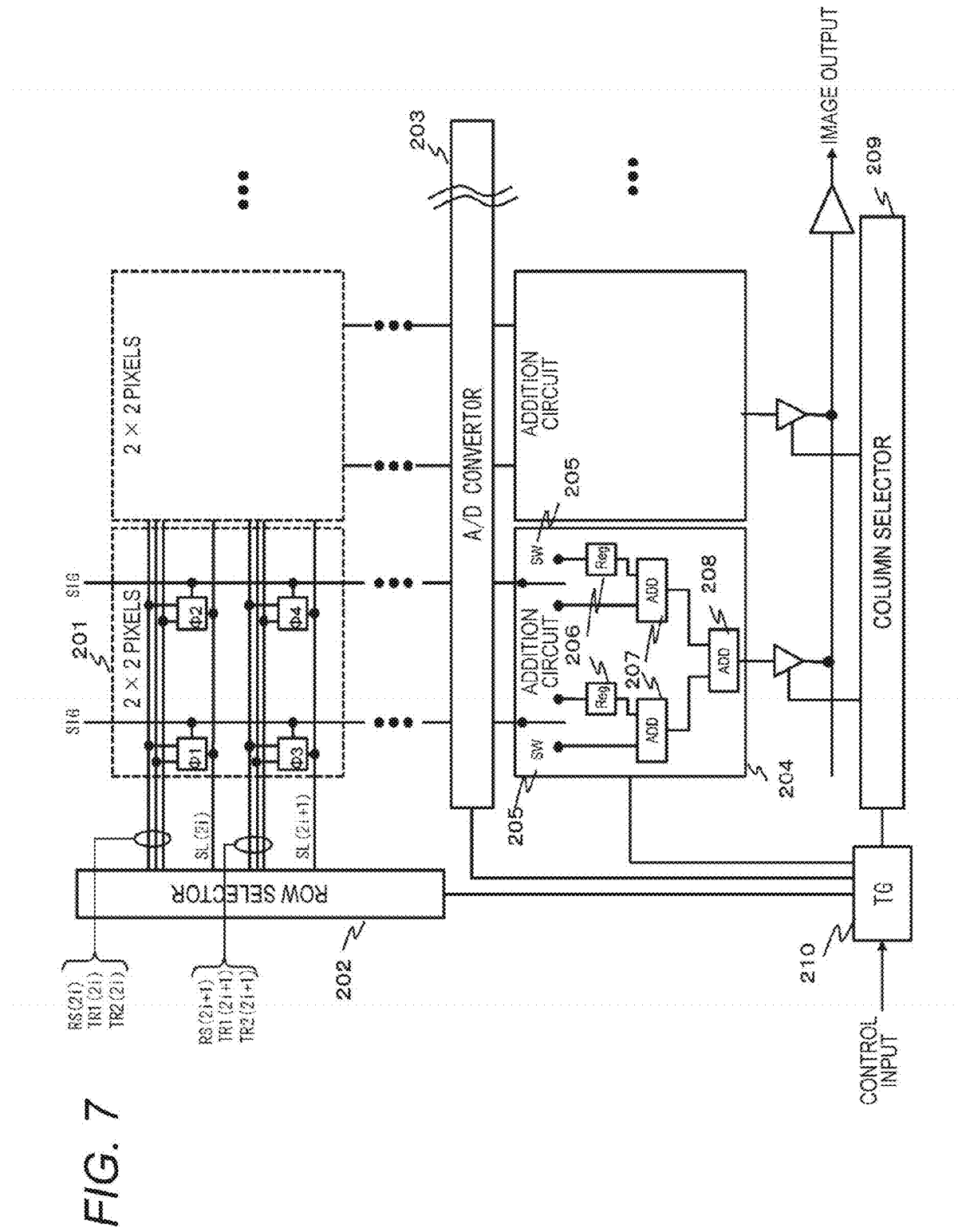
FIG. 7 is a diagram illustrating a configuration example of an imaging device.

FIG. 7 illustrates a circuit configuration example including an operation unit that outputs an addition signal of pixel values corresponding to different exposure times acquired in a four pixel block 201 of the same colors according to the present disclosure.

FIG. 7 illustrates a pixel block including four pixels of the same colors, for example, 2×2 pixels configured by pixels of any one color of R, G, and B in the four-divisional Bayer type RGB array illustrated in FIG. 2(2) and an operation process configuration for outputs thereof.

In the 2×2 pixel unit of the same colors, there are four pixels which have an internal configuration illustrated in FIG. 6 and in which different exposure time control is performed.

Hereinafter, these four pixels are described as (Φ1, Φ2, Φ3, and Φ4).

A pixel control signal is supplied from a row selector 202. Pixels Φ1 and Φ2 and pixels Φ3 and Φ4 in the same rows share the reset signal line RS and the row selection signal line SL.

The transmission signal line TR is provided in each of the pixels Φ1, Φ2, Φ3, and Φ4 and is not shared.

A pixel signal read from each pixel is converted into a digital value in an A/D convertor 203, through the column signal line SIG. At the time of reading from the pixels, with a 1H (horizontal) period, the pixels corresponding to one row are synchronized and reading is performed.

The pixel signal that is converted into the digital value in the A/D convertor 203 is added in a 2×2 pixel unit of the same colors in an addition circuit 204 and becomes one pixel signal.

When an output from the A/D convertor 203 is an output signal Row (2i) of a pixel of a row (Row 2i) of an upper side of the four pixel block 201, a switch (SW) 205 of the addition circuit 204 is opened to the side of a register (Reg) 206 and a pixel signal of the Row (2i) is held once in the register (Reg) 206.

Meanwhile, when the output from the A/D convertor 203 is an output signal Row (2i+1) of a pixel of a row (Row 2i+1) of a lower side of the four pixel block 201, the switch (SW) 205 of the addition circuit 204 is opened to the side of an adding unit (ADD) 207 and a pixel signal of the Row (2i+1) is added to the pixel signal of the Row (2i) immediately previously held in the register (Reg) 206, by the adding unit (ADD) 207. Then, the pixel signal is added to an added pixel signal of an adjacent column by an adding unit (ADD) 208 of a rear step and a four pixel addition signal is obtained.

The added pixel signal is sequentially selected from a column selector 209, according to a selection control signal from a timing generator (TG) 210, and is transmitted to an output signal line.

Figure 8:
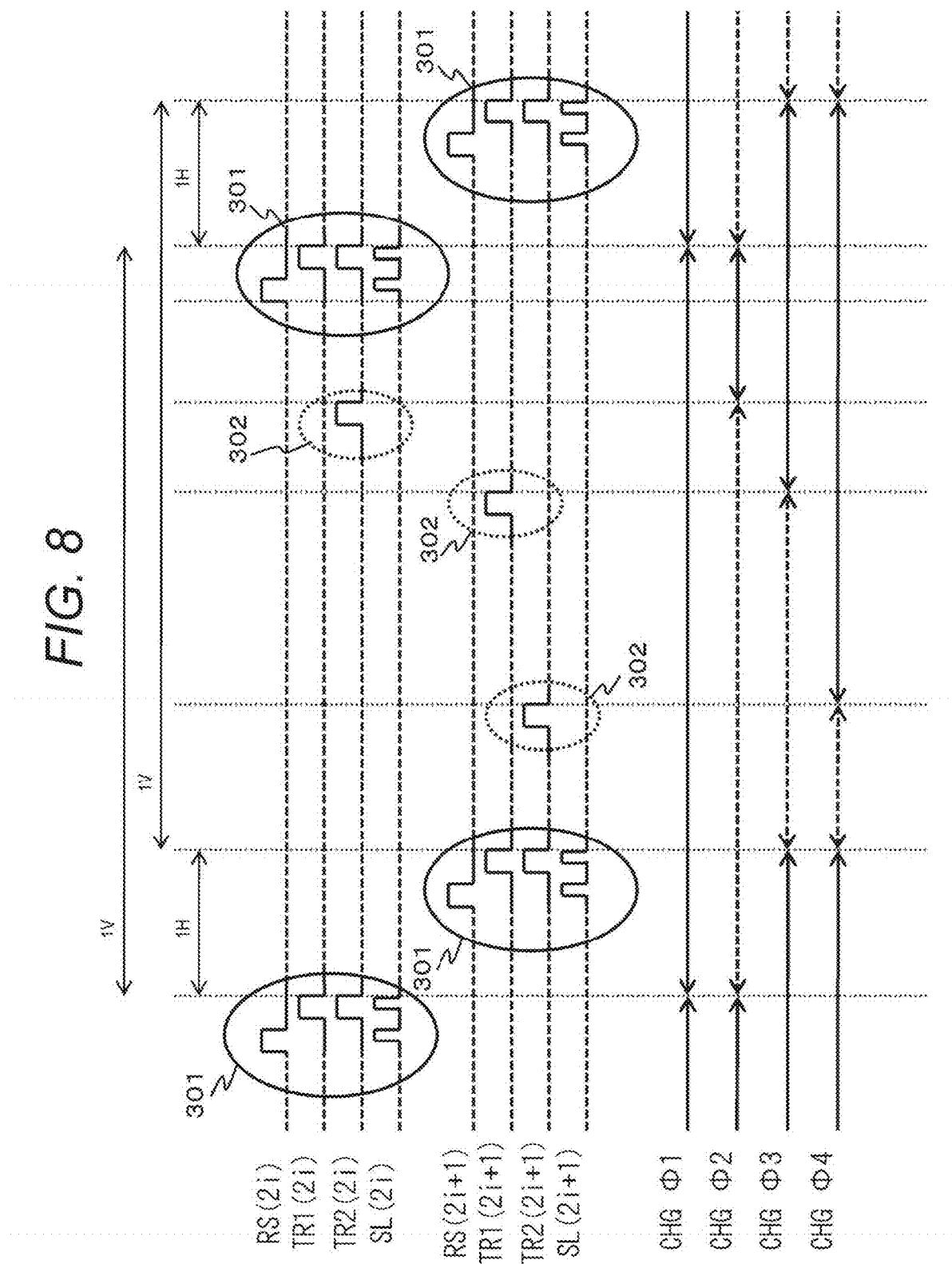
FIG. 8 is a diagram illustrating an exposure control sequence.

FIG. 8 is a diagram illustrating a timing chart of a pixel control signal to set a different exposure time to each of the four pixels included in the pixel block 201 including the four pixels illustrated in FIG. 7.

By a combination of a read control signal 301 transmitted with a 1V (vertical) period and surrounded with a "solid line circle" and a PD reset control signal 302 appropriately transmitted to each pixel according to the length of the exposure and surrounded with a "broken line circle", different exposure time control is realized.

The read control signal 301 (solid line circle) is a control signal to make pixels of one row (1Row) transmit pixel signals to the A/D convertor 203 in synchronization with each other.

For this reason, timings of the output signal Row (2i) of the pixel of the row of the upper side and the output signal Row (2i+1) of the row of the lower side of the pixel block 201 including the four pixels illustrated in FIG. 7 are deviated by 1H.

The configuration of the four pixels of the pixel block 201 including the four pixels illustrated in FIG. 7 are the same as the configuration described above with reference to FIG. 6. A generation process of a pixel signal in each pixel will be described with reference to FIG. 6.

First, the reset signal RS is applied to the transistor M2 and the charge accumulated in the floating diffusion FD is reset. When a charge level reaches a reset level sufficiently, the row selection signal SL is applied to the transistor M4 and a source current of the transistor M3 according to the reset level of the FD flows to the column signal line (SIG) and is transmitted as the reset level to the A/D convertor 203 illustrated in FIG. 7.

Next, the reset signal RS and the row selection signal SL become OFF once, the transmission signal TS is applied to the transistor M1, and the charge generated by the photodiode PD is transmitted to the floating diffusion FD. When the transmission is sufficiently completed, the column selection signal SL is applied to the transistor M4 and a source current of the transistor M3 according to a charge amount of the floating diffusion FD flows to the column signal line and is transmitted as a pixel signal level as the A/D convertor 203 illustrated in FIG. 7. In the A/D convertor 203, an accurate pixel signal is obtained by detecting a difference of the reset level and the pixel signal level.

A period between read control and next read control after 1V is an exposure period. The reset control signal (broken line circle) 302 is control to transmit the charge accumulated by the photodiode PD to the floating diffusion FD by providing the transmission signal TS appropriately during the exposure period. Because the charge transmitted by the reset control may be reset first in the read control, the charge is not read as the pixel signal. For this reason, a period from the transmission signal of the reset control to the transmission signal of the read control becomes a substantial exposure period. In the configuration according to the present invention, because the transmission signal TS can be applied independently to the four pixels in the 2×2 pixel unit, exposure periods of desired four pixels can be combined.

In the timing chart illustrated in FIG. 8, an example of the case in which the reset control is not performed for the pixel Φ1, the reset control signal 302 is applied to the other pixels Φ2, Φ3, and Φ4 at different timings to perform the different reset control, and exposure of Φ1 ⇒ long time, Φ2 ⇒ short time, Φ3 ⇒ mid-short time, and Φ4 ⇒ mid-long time is realized is illustrated. In CHG Φ1 to CHG Φ4 illustrated in FIG. 8, a period of a solid line shows an exposure period.

The exposure period is set as Φ1>Φ4>Φ3>Φ2.

[6. Floating Diffusion (FD) Addition Configuration Example]

In the embodiment described above, each of the four pixels configuring the pixel block has the configuration illustrated in FIG. 6, an output from each pixel is added in the operation unit having the addition circuit, and an output pixel value is generated.

Each pixel has an individual floating diffusion (FD) in the pixel unit as illustrated in FIG. 6 and an output from each FD is added in the addition circuit 204 illustrated in FIG. 7.

Figure 9:
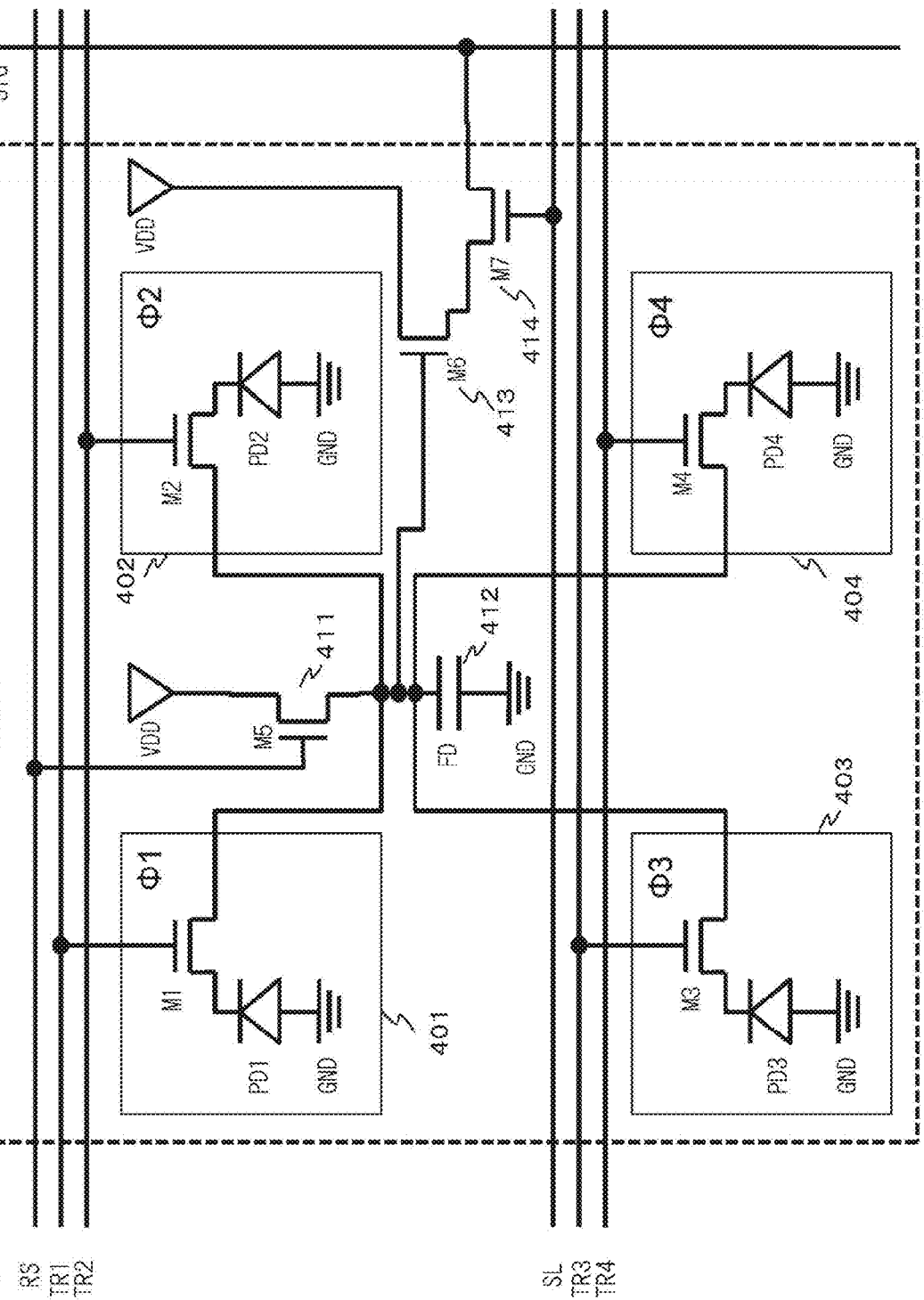
FIG. 9 is a diagram illustrating a configuration example of an imaging device.

Next, as illustrated in FIG. 9, a configuration example in which the floating diffusion (FD) of each pixel unit is omitted, one sharing floating diffusion (FD) is set in the unit of the four pixels configuring the pixel block, and an addition process of pixel values of the pixel block is executed in the sharing floating diffusion (FD) will be described. That is, the sharing floating diffusion (FD) functions as an addition pixel value generating unit.

In this embodiment, as illustrated in FIG. 9, individual pixels Φ1, 401 to Φ4, 404 of four pixels of the same colors receive transmission signals from different transmission signal lines (TR1 to TR4) and share a sharing floating diffusion (FD) 412 and a reset signal line (RS).

The entire charge generated in the individual pixels Φ1, 401 to Φ4, 404 at the different exposure times is accumulated in one sharing floating diffusion (FD) 412.

By this configuration, pixel signals of the four pixels Φ1, 401 to Φ4, 404 of the different exposure times can be added in one sharing floating diffusion (FD) 412.

In this configuration, individual reading of the pixel values of the four pixels becomes unnecessary and reading of an addition result in one sharing floating diffusion (FD) 412 may be performed. Because the necessary number of times of reading becomes ¼, high speed driving is enabled.

Referring to FIG. 9, a configuration and a process of an imaging device that performs the floating diffusion (FD) addition will be described.

FIG. 9 illustrates a circuit configuration of a pixel unit of a 2×2 pixel unit of the same colors. Regions surrounded with four solid line rectangles correspond to pixels (Φ1, 401, Φ2, 402, Φ3, 403, and Φ4, 404).

The pixels have photodiodes PD1 to PD4 and transmission transistors M1 to M4, respectively.

The configuration outside the pixels (Φ1, 401, Φ2, 402, Φ3, 403, and Φ4, 404) is a portion shared by the pixel block of the 2×2 pixels and a reset transistor M5, 411, a floating diffusion FD 412, an amplification transistor M6, 413, and a row selection transistor M7, 417 are set as sharing elements of the pixel block unit.

As such, the reset signal line RS and the row selection signal line are shared by the 2×2 pixels and the transmission signal line TS (TS1, TS2, TS3, and TS4) is individually supplied to each pixel.

Figure 10:
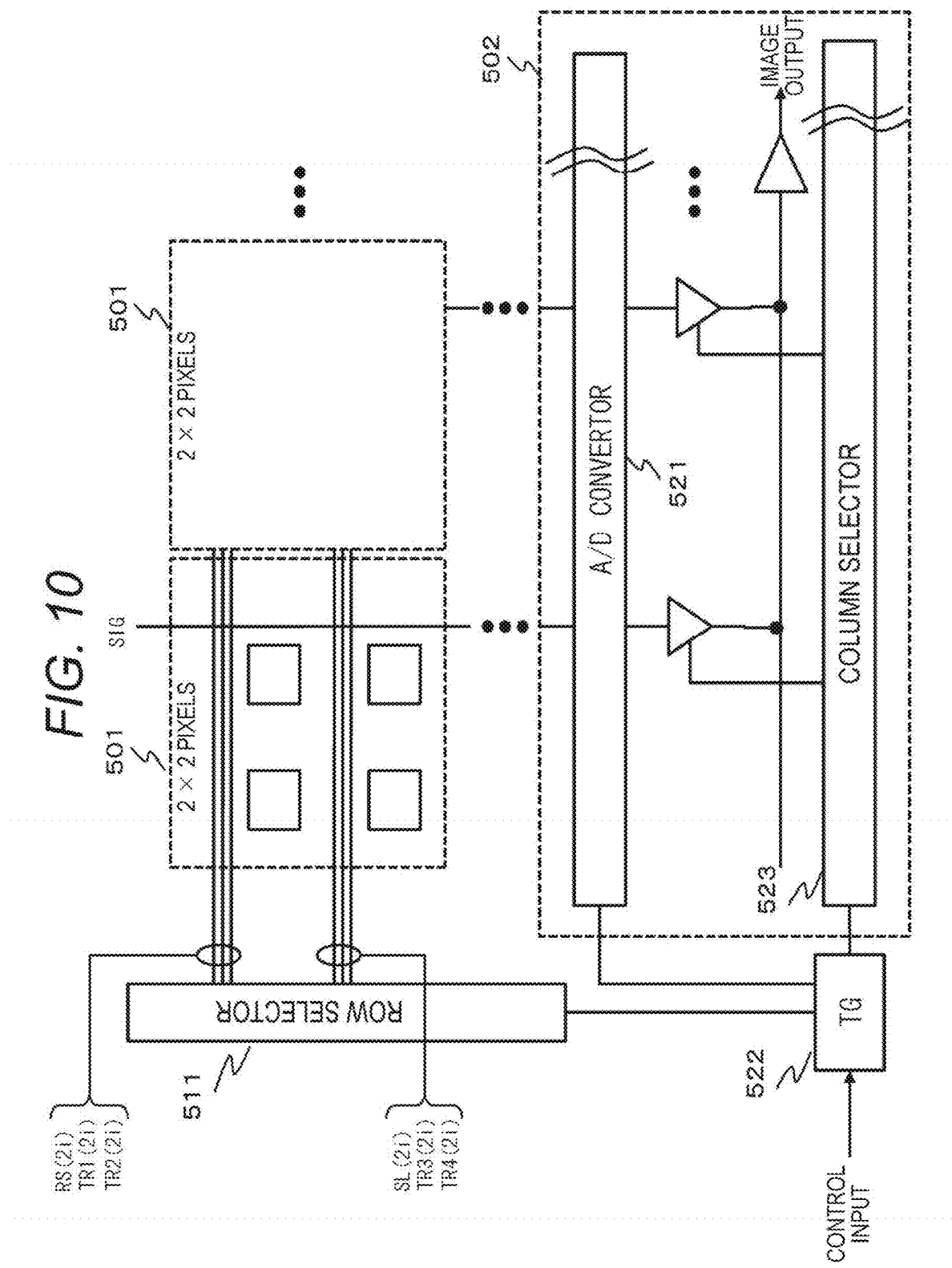
FIG. 10 is a diagram illustrating a configuration example of an imaging device.

FIG. 10 is a diagram illustrating a configuration example of a pixel unit having the floating diffusion (FD) addition configuration illustrated in FIG. 9 and an operation unit.

FIG. 10 illustrates each configuration of a pixel block 501 of 2×2 pixels of the same colors and an output control unit 502.

In the pixel block 501 of the 2×2 pixel unit, four pixels (Φ1, Φ2, Φ3, and Φ4) having the internal configuration described with reference to FIG. 9 are included.

A pixel control signal is supplied from a row selector 511.

From the row selector 511, a reset signal line RS, a row selection signal line SL, and four transmission signal lines TS extend in a row direction, in a unit of two rows (2Row) in which each pixel block is set. The reset signal line RS, the row selection signal line SL, and the four transmission signal lines TS supply a control signal in a unit of 2×2 pixels arranged in the row direction.

A pixel signal obtained by adding pixel values of 2×2=4 pixels in each pixel block in the internal sharing floating diffusion (FD) is input from each pixel block 501 of the 2×2 pixel unit to the A/D convertor 521 through the column signal line SIG and is converted into a digital value in the A/D convertor 521. In this configuration, because a read process of the pixel values added in the unit of each pixel block 501 of the 2×2 pixels is executed, pixel value reading from the pixels is performed with a 2H period.

According to the control signal output through the timing generator (TG) 522, the pixel signal that is converted into the digital value in the A/D convertor 521 is sequentially selected from the column selector 523 and is transmitted to the output signal line.

Figure 11:
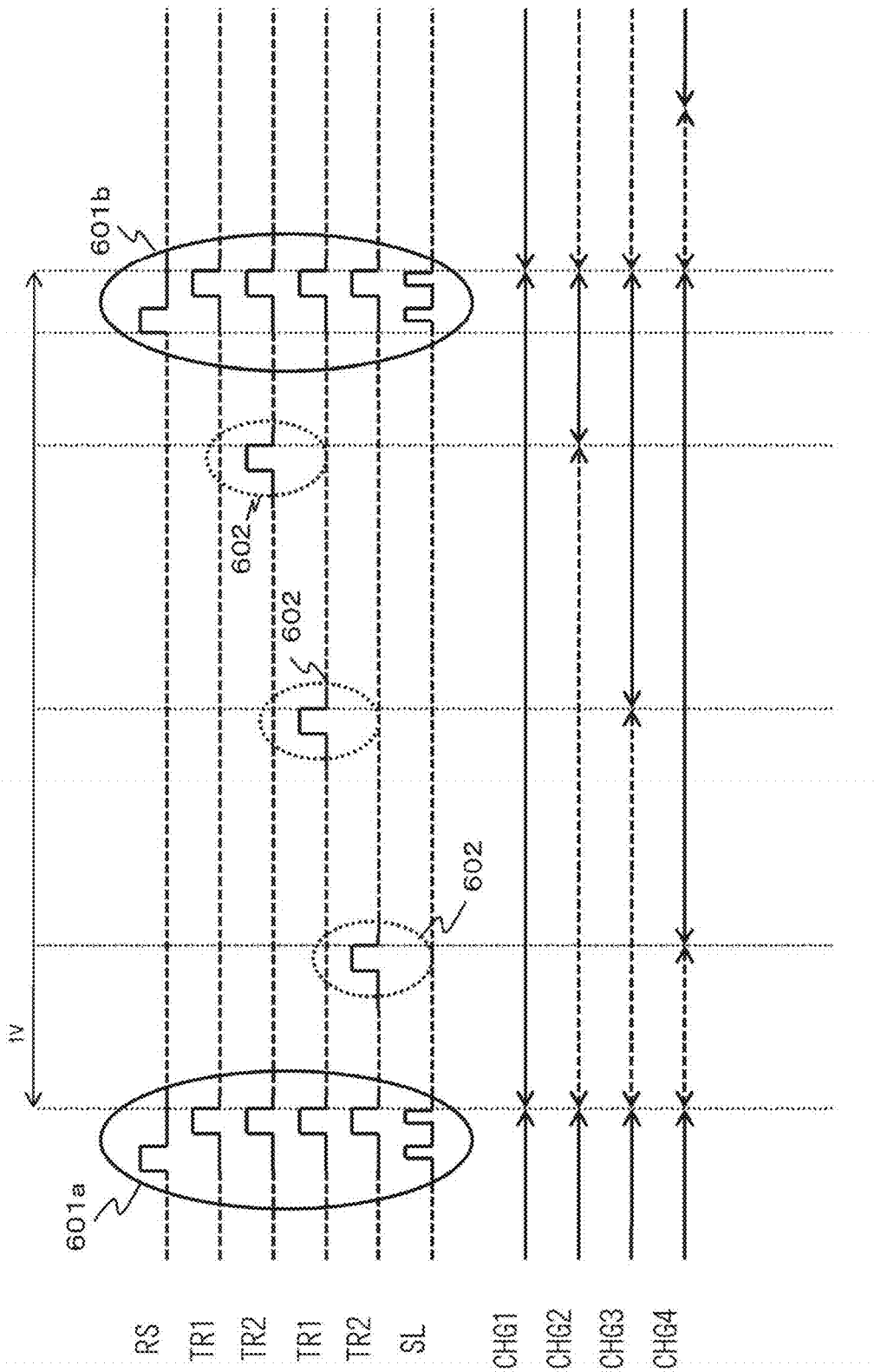
FIG. 11 a diagram illustrating an exposure control sequence.

FIG. 11 is a diagram illustrating a timing chart of a pixel control signal in a configuration in which the floating diffusion (FD) addition process described with reference to FIGS. 9 and 10 is executed.

By a combination of a read control signal 601 transmitted with the 1V period and surrounded with a "solid line circle" and a PD reset control signal 602 appropriately transmitted to each pixel according to the length of the exposure and surrounded with a "broken line circle", exposure time control is performed.

The read control signal 601 is control to make pixels of 2Row transmit pixel signals to the A/D convertor 521 illustrated in FIG. 10 in synchronization with each other.

Because the addition process in one floating diffusion (FD) set to each pixel block is executed for the pixel signal Row (2i) of the row of the upper side and the pixel signal Row (2i+1) of the row of the lower side of each pixel block including the 2×2=4 pixels, the read control signal 601 becomes one same timing of the four pixel unit.

First, the reset signal RS is applied to the transistor M5, 411 illustrated in FIG. 9 and the charge accumulated in the FD 412 to be the sharing FD of the pixel block unit is reset. When a charge level reaches a reset level sufficiently, the row selection signal SL is applied to the transistor M7, 414 and a source current of the transistor M6, 413 according to the reset level of the FD 412 flows to the column signal line and is transmitted as the reset level to the A/D convertor 521 illustrated in FIG. 10.

Next, the reset signal RS and the row selection signal SL become OFF once, the four transmission signals TR1, TR2, TR3, and TR4 configuring the pixel block including the 2×2 pixels and corresponding to the individual pixels are applied to the individual transistors M1, M2, M3, and M4 of the individual pixels Φ1, 401 to Φ4, 404 illustrated in FIG. 9, the charge generated by the individual photodiodes PD of the four pixels Φ1, 401 to Φ4, 404 is transmitted to the floating diffusion FD 412 of the pixel block unit, and the total charge amount is accumulated in the FD 412. When the transmission is sufficiently completed, the column selection signal SL is applied to the transistor M7, 414 and a source current of the transistor M6, 413 according to a charge amount of the FD 412 flows to the column signal line and is transmitted as a pixel signal level as the A/D convertor 521 illustrated in FIG. 10. In the A/D convertor 521 illustrated in FIG. 10, an accurate pixel signal is obtained by detecting a difference of the reset level and the pixel signal level.

In the timing chart illustrated in FIG. 11, a period between a read control signal 601a and a next read control signal 601b after 1V is an exposure period. The reset control signal 602 is a control signal to transmit the charge accumulated by the photodiode PD of each pixel to the sharing FD 412 by providing the transmission signal TS appropriately during the exposure period. Because the charge transmitted by the reset control may be reset first in the read control, the charge is not read as the pixel signal. For this reason, a period from the transmission signal of the reset control to the transmission signal of the read control becomes a substantial exposure period. In the configuration according to the present disclosure, because the transmission signal TS can be applied independently to the four pixels in the 2×2 pixel unit, exposure periods of desired four pixels can be combined.

The control illustrated in FIG. 11 is an example of the case in which the reset control is not performed for the pixel Φ1, the reset process by the reset control signal 602 of the different timing is executed for the pixels Φ2, Φ3, and Φ4, and exposure of Φ1⇒long time, Φ2⇒short time, Φ3⇒mid-short time, and Φ4 mid-long time is realized. In CHG Φ1 to CHG Φ4, a period of a solid line shows an exposure period.

In this example, the exposure period is set as Φ1>Φ4>Φ3>Φ2.

[7. With Respect to Other Embodiments]

In the above-described embodiment, the process example for the imaging element having the four-divisional Bayer type RGB array illustrated in FIG. 1(2) has been described. However, the configuration according to the present disclosure can be applied to other pixel configurations.

That is, if a pixel array is the pixel array in which the same colors are set in the 2×2 pixel unit, the array of the colors of the 2×2 pixels is not limited in particular. In order to obtain a color image by the signal process after the pixel addition and output, it is effective to arrange the 2×2 pixels of RGB like the Bayer array. However, if an appropriate signal process (a demosaic process, color correction, or a color matrix process) can be prepared, the present invention can be applied to an array other than the Bayer array of RGB.

For example, the present disclosure can be applied to the four-divisional WRB type array described above with reference to FIG. 2(3).

Figure 12:
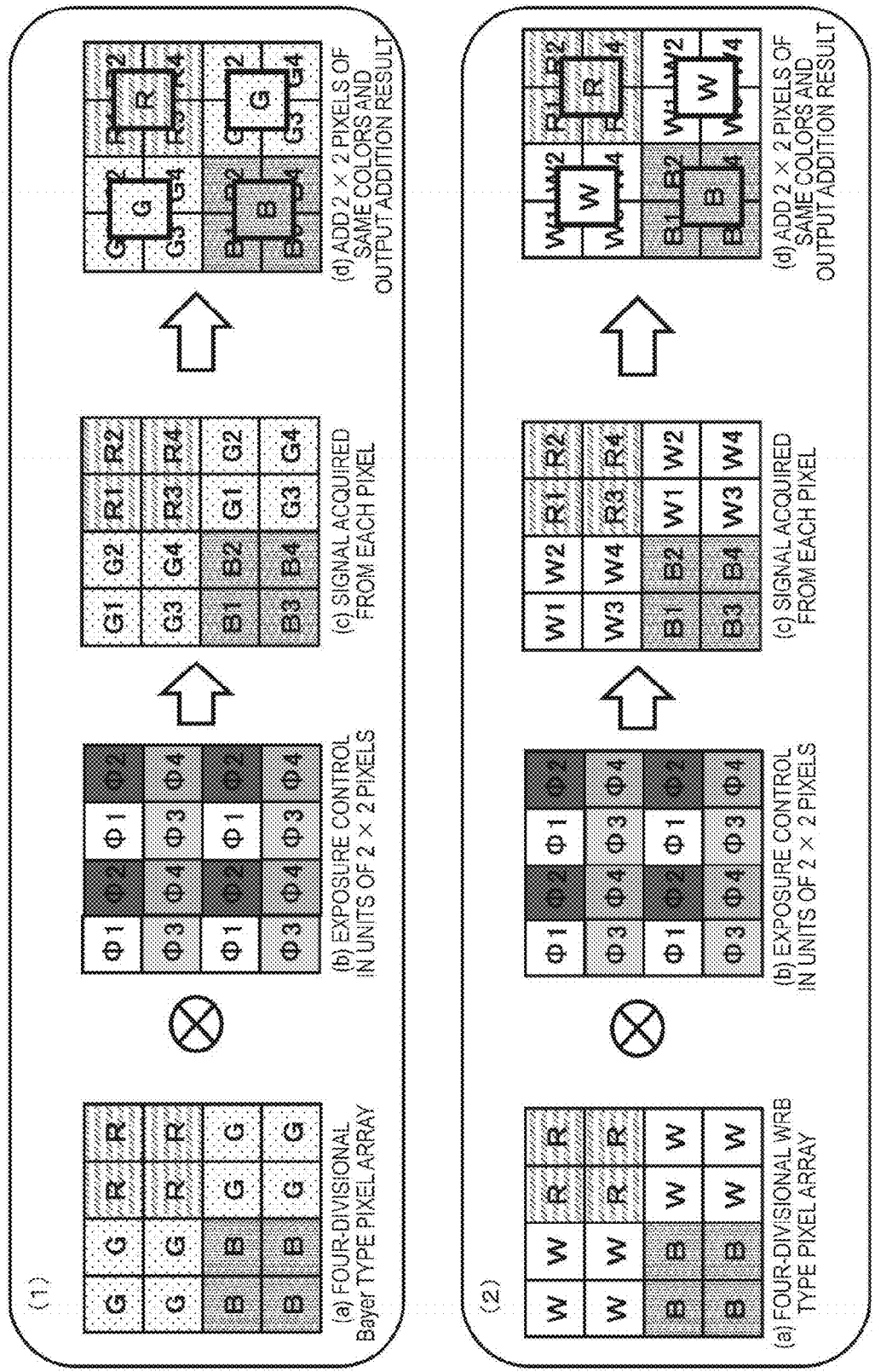
FIG. 12 is a diagram illustrating a configuration of an imaging element and a process example.

That is, as illustrated in FIG. 12(2), the same process can be executed for a Bayer array of 2×2 pixels of a WRB type in which G pixels in the four-divisional RGB type array are replaced by W pixels of a total visible light wavelength transmission type (for example, using an on-chip filter transmitting a total visible light wavelength).

In addition, the exposure time control or the operation process described in the above-described embodiment can be executed as a process according to a program executed in a control unit.

[8. Summary of Configuration According to Present Disclosure]

Embodiments of the present disclosure have been described in detail with reference to the specific embodiments. However, it is apparent that those skilled in the art may find modifications and alternations of the embodiments without departing from the scope of the present disclosure. That is, the present invention is disclosed in an exemplary form and thus, it should be noted that the present invention is not analyzed to be limited. To determine the scope of the present disclosure, it is necessary to take claims into consideration.

In addition, the technology disclosed in the present specification may take the following configurations.

(1) An imaging apparatus including:
a pixel unit in which pixel blocks each including a plurality of pixels of the same colors are arranged;
a control unit that performs control of a different exposure time for each of the plurality of pixels of the same colors configuring the pixel block; and
an addition pixel value generating unit that generates an addition pixel value obtained by adding outputs of the plurality of pixels of the same colors of the pixel block.

(2) The imaging apparatus according to (1),
wherein the addition pixel value generating unit is configured by an addition circuit having an adding unit that adds the outputs of the plurality of pixels of the same colors of the pixel block.

(3) The imaging apparatus according to (1) or (2),
wherein the pixel block is configured by pixels of the same colors including a plurality of pixels of a plurality of rows×a plurality of columns, and
the addition circuit has a register that stores pixel values of a plurality of pixels set to a precedent read row of the pixel block and an adding unit that adds read pixel values of a plurality of pixels set to a following read row of the pixel block and the pixel values stored in the register.

(4) The imaging apparatus according to any of (1) to (3),
wherein the pixel block is configured by pixels of the same colors including four pixels of 2 rows×2 columns, and
the addition circuit has a register that stores pixel values of two pixels set to a precedent read row of the pixel block and an adding unit that adds read pixel values of two pixels set to a following read row of the pixel block and the pixel values stored in the register.

(5) The imaging apparatus according to (1),
wherein the addition pixel value generating unit is configured by a floating diffusion (FD) set in the pixel block unit, and
the floating diffusion (FD) has a configuration in which a charge output from each of the plurality of pixels of the same colors configuring the pixel block is accumulated.

(6) The imaging apparatus according to any of (1) to (5),
wherein the pixel unit has a four-divisional Bayer type RGB array and has an array configuration of a pixel block including four pixels in a unit of each color of R, G, and B.

(7) The imaging apparatus according to any of (1) to (5),
wherein the pixel unit has a four-divisional WRB array in which G pixels in a four-divisional Bayer type RGB array are replaced by W pixels of a total visible light wavelength transmission type and has an array configuration of a pixel block including four pixels in a unit of each color of W, R, and B.

A method of the processes executed in the apparatuses and the systems, a program for causing the processes to be executed, and a recording medium having the program recorded therein are also included in the configuration according to the present disclosure.

In addition, the series of processes described in the specification can be executed by hardware, software, or a composite configuration of both the hardware and the software. When the processes are executed by the software, a program having a process sequence recorded therein can installed in a memory in a computer embedded in dedicated hardware and can be executed or the program can be installed in a general-purpose computer in which various processes can be executed and can be executed. For example, the program can be recorded on a recording medium in advance. In addition to installation of the program from the recording medium to the computer, the program can be received through a network such as a local area network (LAN) and the Internet and the program can be installed in a recording medium such as an embedded hard disk.

The various processes described in the specification are not limited to only being executed in time series according to the description and may be executed in parallel or individually, according to the processing capability of the apparatus executing the processes or necessity. In addition, the system in the present specification means a logical aggregate structure of a plurality of apparatuses and is not limited to a structure in which an apparatus of each configuration is in the same casing.

INDUSTRIAL APPLICABILITY

As described above, according to the configuration of one embodiment of the present disclosure, an apparatus and a method for generating a wide dynamic range image by executing a pixel value combination process of a long time exposure pixel and a short time exposure pixel are realized.

Specifically, control of a different exposure time is performed for each of a plurality of pixels of the same colors configuring a pixel block and an addition pixel value obtained by adding outputs of the plurality of pixels of the same colors of the pixel block is generated. The generation of the addition pixel value is executed in an operation unit having an adding unit that that adds the outputs of the plurality of pixels of the same colors of the pixel block. Or, the generation of the addition pixel value is executed by a floating diffusion (FD) set in a pixel block unit and a charge output from each of the plurality of pixels of the same colors configuring the pixel block is accumulated and output in the floating diffusion (FD).

By this configuration, a wide dynamic range image can be generated.

REFERENCE SIGNS LIST

10 Bright threshold level
11 High brightness region
12 Low brightness region
100 Imaging apparatus
101 Optical lens
102 Imaging device
103 Signal processing unit
105 Control unit
120 Output image
151 Pixel unit
160 Operation unit
161 A/D convertor
162 Pixel information combining unit
163 Output unit
181 Multiple different exposure time pixel information
201 Pixel block
202 Row selector
203 A/D convertor
204 Addition circuit
205 Switch
206 Register
207,208 Adding unit
209 Column selector
210 Timing generator (TG)
401-404 Pixel
411,413,414 Transistor
412 Floating diffusion (FD)
501 Pixel block
502 Output control unit
511 Row selector
521 A/D convertor
522 Timing generator (TG)
523 Column selector

The invention claimed is:

1. An imaging apparatus comprising:
a pixel array including a plurality of pixel blocks each of which includes first, second, third, and fourth pixels of a same color, wherein the first pixel and the fourth pixel are arranged on a diagonal direction and the second pixel and the third pixel are arranged on an opposed diagonal direction;
a controller configured to provide control signals for a different exposure time for each of the first, second, third, and fourth pixels of a pixel block, wherein a length of the exposure times is set from longest to shortest for the first pixel, the third pixel, the fourth pixel, and the second pixel, in order; and
an addition circuit configured to generate an addition pixel value by adding outputs of the first, second, third and fourth pixels of the pixel block.

2. The imaging apparatus according to claim 1,
wherein the addition circuit includes an adding unit arranged to add the outputs of the first, second, third, and fourth pixels of the pixel block.

3. The imaging apparatus according to claim 2,
wherein the pixel block is configured by pixels of the same colors including a plurality of pixels of a plurality of rows by a plurality of columns, and
the addition circuit has a register that stores pixel values of a plurality of pixels set to a precedent read row of the pixel block and an adding unit that adds read pixel values of a plurality of pixels set to a following read row of the pixel block and the pixel values stored in the register.

4. The imaging apparatus according to claim 2,
wherein the pixel block is configured by pixels of the same colors including four pixels of 2 rows by 2 columns, and
the addition circuit has a register that stores pixel values of two pixels set to a precedent read row of the pixel block and an adding unit that adds read pixel values of two pixels set to a following read row of the pixel block and the pixel values stored in the register.

5. The imaging apparatus according to claim 1,
wherein the addition circuit comprises a floating diffusion (FD) set in the pixel block unit, and
the floating diffusion (FD) has a configuration in which a charge output from each of the first, second, third, and fourth pixels of the pixel block is accumulated.

6. The imaging apparatus according to claim 1,
wherein the pixel array is configured as a four-divisional Bayer type RGB array and has an array configuration of a pixel block including four pixels in a unit of each color of R, G, and B.

7. The imaging apparatus according to claim 1,
wherein the pixel array is configured as a four-divisional WRB array in which G pixels in a four-divisional Bayer type RGB array are replaced by W pixels of a total visible light wavelength transmission type and has an array configuration of a pixel block including four pixels in a unit of each color of W, R, and B.

8. A signal processing method that is executed in an imaging apparatus including a pixel array comprising a plurality of pixel blocks each of which includes first, second, third, and fourth pixels of a same color, wherein the first pixel and the fourth pixel are arranged on a diagonal direction and the second pixel and the third pixel are arranged on an opposed diagonal direction, the method comprising:
performing control of a different exposure time for each of the first, second, third, and fourth pixels of a pixel block, wherein a length of the exposure time is set from longest to shortest for the first pixel, the third pixel, the fourth pixel, and the second pixel, in order; and generating an addition pixel value by adding outputs of the first, second, third, and fourth pixels of the pixel block.

9. A non-transitory recording medium encoded with a plurality of processor-executable instructions that, when executed by at least one processor, cause a signal process to be executed in an imaging apparatus including a pixel array comprising a plurality of pixel blocks each of which includes first, second, third, and fourth pixels of the same color, wherein the first pixel and the fourth pixel are arranged on a diagonal direction and the second pixel and the third pixel are arranged on an opposed diagonal direction, the signal process comprising:

performing control of a different exposure time for each of the first, second, third, and fourth pixels of a pixel block, wherein a length of the exposure times is set from longest to shortest for the first pixel, the third pixel, the fourth pixel, and the second pixel, in order; and generating an addition pixel value by adding outputs of the first, second, third, and fourth pixels of the pixel block.

* * * * *